United States Patent
Einberg

(10) Patent No.: US 10,192,372 B2
(45) Date of Patent: Jan. 29, 2019

(54) CONSIDERING WHETHER A PORTABLE KEY DEVICE IS LOCATED INSIDE OR OUTSIDE A BARRIER

(71) Applicant: ASSA ABLOY AB, Stockholm (SE)

(72) Inventor: Fredrik Einberg, Huddinge (SE)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/559,887

(22) PCT Filed: Mar. 21, 2016

(86) PCT No.: PCT/EP2016/056145
§ 371 (c)(1),
(2) Date: Sep. 20, 2017

(87) PCT Pub. No.: WO2016/150911
PCT Pub. Date: Sep. 29, 2016

(65) Prior Publication Data
US 2018/0061156 A1    Mar. 1, 2018

(30) Foreign Application Priority Data

Mar. 23, 2015 (EP) .................................. 15160225

(51) Int. Cl.
*G07C 9/00* (2006.01)
*G08C 17/02* (2006.01)
(Continued)

(52) U.S. Cl.
CPC ............ *G07C 9/00111* (2013.01); *G01S 3/18* (2013.01); *G01S 5/02* (2013.01); *G07C 9/00309* (2013.01);
(Continued)

(58) Field of Classification Search
CPC ...... G07C 9/00111; G07C 9/00; G08C 17/02; H04W 4/04; H04W 12/08; H04W 48/04
(Continued)

(56) References Cited

U.S. PATENT DOCUMENTS 7,548,151 B2 * 6/2009 Roosli ..................... E05B 47/00
340/5.6
7,706,778 B2    4/2010 Lowe
(Continued)

FOREIGN PATENT DOCUMENTS

EP    2434461    3/2012
EP    2493232    8/2012
(Continued)

OTHER PUBLICATIONS

International Search Report and Written Opinion prepared by the European Patent Office dated May 27, 2016, for International Application No. PCT/EP2016/056145.
(Continued)

*Primary Examiner* — Nam V Nguyen
(74) *Attorney, Agent, or Firm* — Sheridan Ross P.C.

(57) ABSTRACT

It is presented an access control device for considering whether a portable key device is located inside or outside a barrier. The access control device comprises: a first antenna being configured to be directed towards the outside of the barrier with a first antenna lobe; a second antenna being configured to be directed towards the inside of the barrier with a second antenna lobe, a gain towards the outside by the second antenna is greater than a gain towards the inside by the first antenna, and the signal strength from the portable key device using the second antenna is greater than using the first antenna at all positions of the portable key device on the inside; and a determiner arranged to consider the portable key device to be located on the outside of the barrier only
(Continued)

when a first signal strength of a radio signal from the portable key device received by the first antenna is greater than a second signal strength of a radio signal from the portable key device received by the second antenna.

7 Claims, 3 Drawing Sheets

(51) Int. Cl.
*H04W 12/08* (2009.01)
*H04L 29/06* (2006.01)
*H04W 4/00* (2018.01)
*G01S 3/18* (2006.01)
*G01S 5/02* (2010.01)

(52) U.S. Cl.
CPC ........ *G01S 5/0252* (2013.01); *G07C 2209/63* (2013.01)

(58) Field of Classification Search
USPC ................................ 340/5.64, 5.6, 5.61, 5.7
See application file for complete search history.

(56) References Cited

U.S. PATENT DOCUMENTS

| | | | |
|---|---|---|---|
| 8,074,271 | B2 | 12/2011 | Davis et al. |
| 9,007,173 | B2* | 4/2015 | McIntyre ............ G07C 9/00309 340/5.6 |
| 9,196,104 | B2* | 11/2015 | Dumas ................ G07C 9/00571 |
| 9,336,637 | B2* | 5/2016 | Neil .................... G07C 9/00571 |
| 9,761,072 | B2* | 9/2017 | Arfwedson ........ G07C 9/00309 |
| 2002/0178385 | A1 | 11/2002 | Dent et al. |
| 2004/0068935 | A1* | 4/2004 | Ichikawa ................ E05B 85/01 49/25 |
| 2006/0164208 | A1* | 7/2006 | Schaffzin ........... G07C 9/00182 340/5.64 |
| 2007/0024417 | A1 | 2/2007 | Gerstenkorn |
| 2008/0284564 | A1 | 11/2008 | Leitch |
| 2010/0201482 | A1* | 8/2010 | Robertson ........... G07C 9/00111 340/5.61 |
| 2012/0234058 | A1 | 9/2012 | Neil et al. |
| 2013/0015947 | A1 | 1/2013 | Best |
| 2013/0044055 | A1 | 2/2013 | Karmarkar et al. |
| 2013/0060577 | A1 | 3/2013 | Debusk et al. |
| 2013/0095802 | A1 | 4/2013 | Wang |
| 2013/0124855 | A1 | 5/2013 | Varadarajan et al. |
| 2013/0241694 | A1 | 9/2013 | Sharma et al. |
| 2013/0324081 | A1 | 12/2013 | Gargi et al. |
| 2014/0091903 | A1 | 4/2014 | Birkel et al. |
| 2014/0120905 | A1 | 5/2014 | Kim |
| 2014/0282877 | A1 | 9/2014 | Mahaffey et al. |
| 2014/0282927 | A1 | 9/2014 | McLaughlin et al. |
| 2014/0373111 | A1 | 12/2014 | Moss et al. |
| 2015/0028996 | A1 | 1/2015 | Agrafioti et al. |
| 2015/0067803 | A1 | 3/2015 | Alduaiji |
| 2015/0070136 | A1* | 3/2015 | Kameyama ............. B60R 25/20 340/5.72 |
| 2015/0121465 | A1 | 4/2015 | Berns et al. |
| 2015/0309767 | A1 | 10/2015 | Osoinach et al. |
| 2016/0240023 | A1* | 8/2016 | Toivonen ........... G07C 9/00309 |

FOREIGN PATENT DOCUMENTS

| | | |
|---|---|---|
| EP | 2620919 | 7/2013 |
| GB | 2402840 | 12/2004 |
| WO | WO 2007/121414 | 10/2007 |
| WO | WO 2009/143415 | 11/2009 |
| WO | WO 2012/113080 | 8/2012 |
| WO | WO 2013/118454 | 8/2013 |
| WO | WO 2014/098755 | 6/2014 |
| WO | WO 2014/191537 | 12/2014 |
| WO | WO 2016/177666 | 11/2016 |
| WO | WO 2016/177668 | 11/2016 |

OTHER PUBLICATIONS

International Search Report and Written Opinion for International (PCT) Patent Application No. PCT/EP2016/059746, dated Jul. 22, 2016 11 pages.
Second Written Opinion for International (PCT) Patent Application No. PCT/EP2016/059746, dated Mar. 31, 2017 6 pages.
International Preliminary Report on Patentability for International (PCT) Patent Application No. PCT/EP2016/059746, dated Jul. 26, 2017 17 pages.
International Search Report and Written Opinion for International (PCT) Patent Application No. PCT/EP2016/059748, dated Jun. 24, 2016 13 pages.
Second Written Opinion for International (PCT) Patent Application No. PCT/EP2016/059748, dated Mar. 30, 2017 8 pages.
International Preliminary Report on Patentability for International (PCT) Patent Application No. PCT/EP2016/059748, dated Jun. 29, 2017 19 pages.
Official Action for U.S. Appl. No. 15/569,218, dated Nov. 16, 2018 14 pages.

* cited by examiner

CONSIDERING WHETHER A PORTABLE KEY DEVICE IS LOCATED INSIDE OR OUTSIDE A BARRIER

CROSS REFERENCE TO RELATED APPLICATIONS

This application is a national stage application under 35 U.S.C. 371 and claims the benefit of PCT Application No. PCT/EP2016/056145 having an international filing date of 21 Mar. 2016, which designated the United States, which PCT application claimed the benefit of European Patent Application No. 15160225.7 filed 23 Mar. 2015, the disclosure of each of which are incorporated herein by reference.

TECHNICAL FIELD

The invention relates to a method, access control device, computer program and computer program product for considering whether a portable key device is located inside or outside a barrier.

BACKGROUND

Lock devices and key devices are evolving from the traditional pure mechanical locks. These days, there are wireless interfaces for electronic lock devices, e.g. by interacting with a portable key device. Such interaction can even occur without user interaction, e.g. with a portable key device being located in a pocket or handbag. However, in such a situation, there is a risk that someone on the inside unlocks the lock device by simply walking by the lock device. In order to prevent this from happening, without introducing user interaction to open the lock device, there needs to be a way to determine whether a portable key device is on the inside or on the outside. In this way, automatic access control could be disabled for inside devices, preventing inadvertent unlocking.

US 2012/0234058 discloses a wireless access control system including a lock. The lock includes an interior facing directional antenna and an external facing directional antenna. Each is operatively coupled to wireless communication circuitry to send signals to, and list for signals from, remote access device. If remote access device is interior of the lock, then interior facing directional antenna communicates with remote access device, and the signal strength sensed by directional antenna will be greater than the signal strength sensed by directional antenna (which may be no sensed signal). Lock, and in turn system, determine that remote access device is inside the home, dwelling or structure.

However, such a determination of position based on dual antenna signals has proven to be unreliable. This is due to radio signals being distorted by reflections and fading which depends on external objects and interference, which can not be reliably controlled.

SUMMARY

According to a first aspect, it is presented a method for considering whether a portable key device is located inside or outside a barrier. The method is performed in an access control device and comprises the steps of: measuring a first signal strength of a radio signal from the portable key device using a first antenna, the first antenna being directed towards the outside of the barrier with a first antenna lobe; measuring a second signal strength of a radio signal from the portable key device using a second antenna, the second antenna being directed towards the inside of the barrier with a second antenna lobe. The second antenna lobe is wider than the first antenna lobe. A gain towards the outside by the second antenna is greater than a gain towards the inside by the first antenna. The signal strength from the portable key device using the second antenna is greater than using the first antenna at all positions of the portable key device on the inside. The method also comprises the step of considering the portable key device to be located on the outside of the barrier only when the first signal strength is greater than the second signal strength.

The method may further comprise the step of: performing an access determination procedure, resulting in granted or denied access, only when the portable key device is considered to be on the outside of the barrier.

According to a second aspect, it is presented an access control device for considering whether a portable key device is located inside or outside a barrier. The access control device comprises: a first antenna being configured to be directed towards the outside of the barrier with a first antenna lobe; a second antenna being configured to be directed towards the inside of the barrier with a second antenna lobe wherein the second antenna lobe is wider than the first antenna lobe, a gain towards the outside by the second antenna is greater than a gain towards the inside by the first antenna, and the signal strength from the portable key device using the second antenna is greater than using the first antenna at all positions of the portable key device on the inside; and a determiner arranged to consider the portable key device to be located on the outside of the barrier only when a first signal strength of a radio signal from the portable key device received by the first antenna is greater than a second signal strength of a radio signal from the portable key device received by the second antenna.

The determiner may comprise a processor; and a memory storing instructions that, when executed by the processor, causes the access control device to: measure the first signal strength of a radio signal from the portable key device using the first antenna; measure the second signal strength of a radio signal from the portable key device using the second antenna; and consider the portable key device to be located on the outside of the barrier only when the first signal strength is greater than the second signal strength.

The access control device may further comprise instructions that, when executed by the processor, causes the access control device to: perform an access determination procedure, resulting in granted or denied access, only when the portable key device is considered to be on the outside of the barrier.

According to a third aspect, it is presented a computer program for considering whether a portable key device is located inside or outside a barrier. The computer program comprises computer program code which, when run on an access control device, causes the access control device to: measure a first signal strength of a radio signal from the portable key device using a first antenna, the first antenna being directed towards the outside of the barrier with a first antenna lobe; measure a second signal strength of a radio signal from the portable key device using a second antenna, the second antenna being directed towards the inside of the barrier with a second antenna lobe, wherein the second antenna lobe is wider than the first antenna lobe, a gain towards the outside by the second antenna is greater than a gain towards the inside by the first antenna, and the signal strength from the portable key device using the second antenna is greater than using the first antenna at all positions of the portable key device on the inside; and consider the portable key device to be located on the outside of the barrier only when the first signal strength is greater than the second signal strength.

According to a fourth aspect, it is presented a computer program product comprising a computer program according to the third aspect and a computer readable means on which the computer program is stored.

The term 'consider' whenever used herein in the claims or the description, is to be construed as a determination which may or may not always be completely representative of reality. For instance, considering a portable key device to be located on the inside of the barrier has the result of any subsequent processing to be based on the device being located on the inside of the barrier; however, the portable key device could in reality be located on the outside of the barrier.

The phrase "towards the inside" whenever used herein in the claims or the description is to be defined as the direction perpendicular to the barrier towards the inside. Analogously, the phrase "towards the outside" whenever used herein in the claims or the description is to be construed as the direction perpendicular to the barrier towards the outside.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
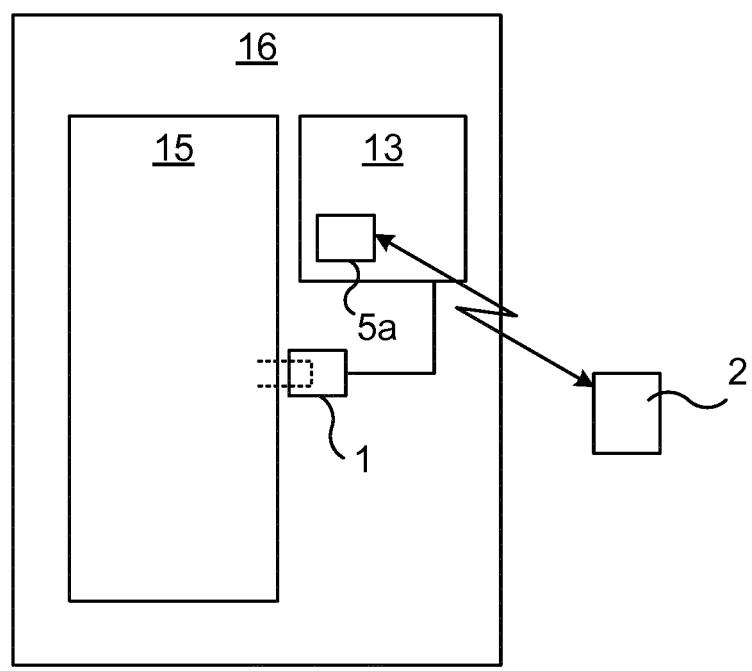
FIG. 1 is a schematic diagram showing an environment in which embodiments presented herein can be applied.

FIG. 1 is a schematic diagram showing an environment in which embodiments presented herein can be applied. Access to a physical space is restricted by a physical barrier 15 which is selectively unlockable. For instance, the barrier 15 can be a door, gate, hatch, window, etc. In order to unlock the barrier 15, an access control device 13 is provided. The access control device 13 is connected to a physical lock device 1, which is controllable by the access control device 13 to be set in an unlocked state or locked state. In this embodiment, the access control device 13 is mounted close to the physical lock device 1. The barrier 15 is provided in a surrounding fixed structure 16, such as a wall or fence.

Figure 2:
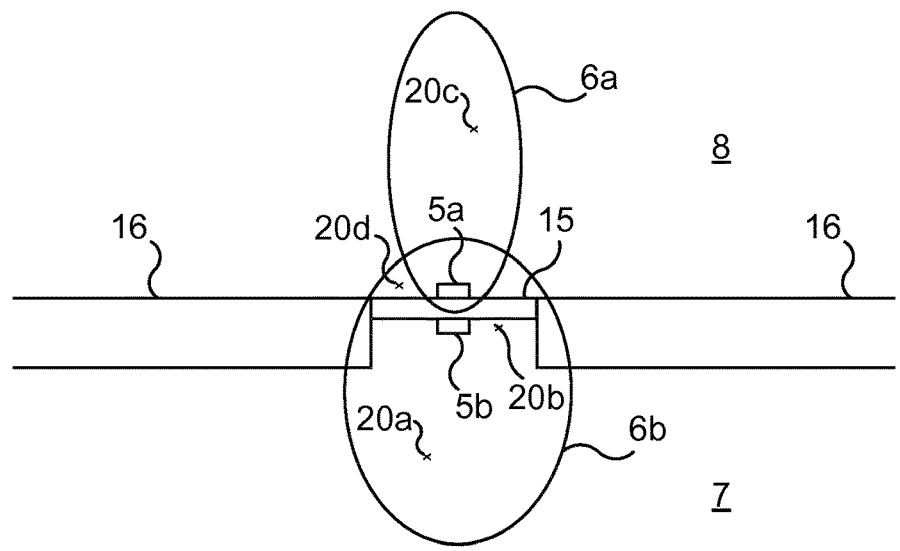
FIG. 2 is a schematic top view diagrams illustrating different main lobes of two antennas for considering whether a portable key device is located inside or outside a barrier in the environment shown in FIG. 1.

The access control device 13 is able to receive and send signals from/to a portable key device 2 over a wireless interface using at least two antennas, of which a first antenna 5a is shown in FIG. 1. Another antenna is provided on the other side of the barrier 15 (as shown in FIG. 2 and explained in more detail below). The portable key device 2 is any suitable device portable by a user and which can be used for authentication over the wireless interface. The portable key device 2 is typically carried or worn by the user and may be implemented as a mobile phone, a smartphone, a key fob, wearable device etc. The wireless interface is a radio frequency wireless interface and could e.g. be using Bluetooth, Bluetooth Low Energy (BLE), ZigBee, any of the IEEE 802.11 standards, any of the IEEE 802.15 standards, wireless USB, etc. Using wireless communication, the authenticity and authority of the portable key device can be checked, e.g. using a challenge and response scheme, after which the access control device grants or denies access. As described in more detail below, one function of the antennas is to enable the determination whether the portable key device 2 is inside or outside the barrier 15.

When access is granted, the access control device 13 sends an unlock signal to the lock device 1, whereby the lock device 1 is set in an unlocked state. In this embodiment, this can e.g. imply a signal over a wire-based communication interface, e.g. using Universal Serial Bus (USB), Ethernet, or even a simple electric connection (e.g. to the lock device 1), or alternatively signal over a wireless communication interface. When the lock device 1 is in an unlocked state, the barrier 15 can be opened and when the lock device 1 is in a locked state, the barrier 15 cannot be opened. In this way, access to a closed space is controlled by the access control device 13. It is to be noted that the access control device 13 and/or the lock device 1 can be mounted in the fixed structure 16 by the physical barrier 15 (as shown) or in the physical barrier 15 itself (not shown).

FIG. 2 is a schematic top view diagrams illustrating different main lobes of two antennas for considering whether a portable key device is located inside or outside a barrier in the environment shown in FIG. 1.

A first antenna 5a is located on the outside 8 of the barrier 15. The first antenna 5a is directed towards the outside 8, which can be seen by the first antenna lobe 6a which is the main antenna lobe of the first antenna 5a.

A second antenna 5b is located on the inside 7 of the barrier 15. The second antenna 5b is directed towards the inside 7, which can be seen by the second antenna lobe 6b which is the main antenna lobe of the second antenna 5b.

It is to be noted that both antennas could be located on the inside 7 or in the outside 8 of the barrier, as long as the first antenna is directed towards the outside 8 and the second antenna is directed towards the inside 7.

Directed is here to be interpreted as the direction in which the reception capability of the antenna in question is the greatest.

The second antenna lobe 6b is wider than the first antenna lobe 6a. Moreover, a gain towards the outside 8 by the second antenna 5b is greater than a gain towards the inside 7 by the first antenna 5a. In other words, the second antenna 5b is able to receive signals from the outside 8 better than the first antenna 5a is able to receive signals from the inside 7. Towards the inside can be defined as the direction perpendicular to the barrier towards the inside. Analogously, towards the outside can be defined as the direction perpendicular to the barrier towards the outside.

Using the different directionality of the antennas, the access control device can determine whether a portable key device is located on the outside 8 or on the inside 7 by evaluating a difference in a first signal strength, received from the portable key device using the first antenna 5a, and a second signal strength, received from the portable key device using the second antenna 5b. The signal strength could e.g. be measured using RSSI (Received Signal Strength Indicator). Specifically, the portable key device is considered to be located on the outside 8 of the barrier 15 only when the first signal strength is greater than the second signal strength. It is to be noted that the situation when the first signal strength and the second signal strength are exactly equal is not important; this is an extremely rare situation and this could be interpreted as the portable key device is on the inside or the outside.

In this way, when a portable key device located in a first location 20a, the signal strength from the portable key device will be greater using the second antenna 5b than using the first antenna 5a. Consequently, the portable key device will then be considered to be on the inside 7. Similarly, in a second location 20b, right by the barrier 15, the signal strength from the portable key device will be greater using the second antenna 5b than using the first antenna 5a. Hence, with this arrangement of the antenna lobes 6a-b, the signal strength using the second antenna 5b is greater than the signal strength using the first antenna 5a at all positions on the inside 7. In contrast, if two antennas with identical lobes were to be used as in the prior art, the difference between the inside and outside would be at a minimum close to the barrier since the crossing of the lobes would occur at the barrier axis, which in some cases results in false outside determinations. False outside determinations are a security risk since this may cause an access control to be started, e.g. when someone walks by the barrier on the inside. On the other hand, with the arrangement of embodiments presented herein, the crossing (intersection) of the lobes is instead in the outside area 8, thereby ensuring no false outside determinations.

When a portable key device located in a third location 20c, the signal strength from the portable key device will be greater when the first antenna 5a is used than when the second antenna 5b is used. Consequently, the portable key device will then be considered to be on the outside 8.

When a portable key device located in a fourth location god, due to the directionality of the antennas as illustrated by the antenna lobes 6a-b, the signal strength from the portable key device will be greater from the second antenna 5b than from the first antenna 5a. Consequently, the portable key device will then be considered to be on the inside 7, even though the fourth location god is actually on the outside 8 of the barrier 15. Hence, access control is only commenced if the portable key device is on the outside 8, if a user positions the portable key device by the fourth position god, the access control device will not commence an access determination procedure. It is beneficial to be restrictive with regard to when to consider a portable key device to be on the outside, since it is a security risk if the opposite occurs, i.e. if a key device on the inside is considered to be on the outside. In such a case, an access determination procedure could result in the lock device unlocking inadvertently, even though the portable key device is on the inside.

On the other hand, the consequence of the false inside determination for the user being on the outside 8, with a portable key device in the fourth position 20d, is not severe. It is only that the user has to move more towards the centre, which is an intuitive way to use a wireless access control system if no action occurs when the portable key device is presented and presents no real problem in terms of usability.

Figure 3:
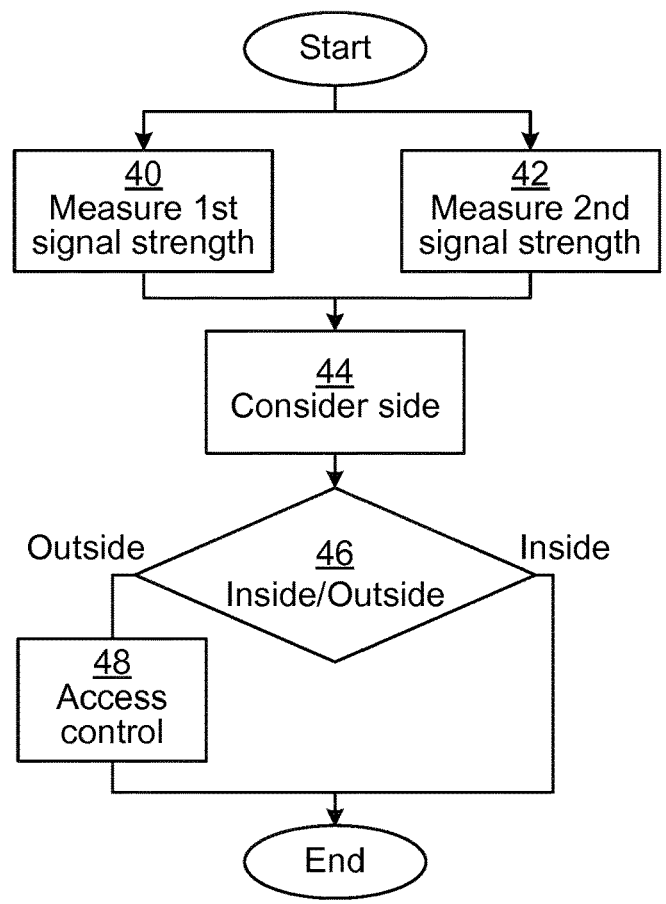
FIG. 3 is a flow chart illustrating an embodiment of a method performed in the access control device of FIG. 1 for considering whether a portable key device is located inside or outside a barrier.

FIG. 3 is a flow chart illustrating an embodiment of a method performed in the access control device of FIG. 1 for determining whether a portable key device is located inside or outside a barrier.

The method can e.g. be started when proximity of a portable key device is detected. Optionally, the method is performed repeatedly indefinitely as long as the access control device is operative.

In a measure $1^{st}$ signal strength step 40, a first signal strength is measure of a radio signal from the portable key device using the first antenna. As explained above, the first antenna is directed towards the outside of the barrier with the first antenna lobe. The first signal strength can e.g. be measured as a received signal strength indication (RSSI). The first signal strength can be based on several signal measurements to mitigate fluctuations in signal strengths. For instance, the first signal strength can be an average value of several samples.

In a measure $2^{nd}$ signal strength step 42, a second signal strength is measured of a radio signal from the portable key device using the second antenna. As explained above, the second antenna is directed towards the inside of the barrier with the second antenna lobe. The second antenna lobe is wider than the first antenna lobe. The second signal strength can e.g. be measured as a RSSI measurement. The second signal strength can be based on several signal measurements to mitigate fluctuations in signal strengths. For instance, the second signal strength can be an average value of several samples.

It is to be noted that the measure $1^{st}$ signal strength step 40 and the measure $2^{nd}$ signal strength step 42 can be performed in parallel or sequentially; it is not important in which order these steps are performed. In one embodiment, the measure $1^{st}$ signal strength step 40 and the measure $2^{nd}$ signal strength step 42 are performed in parallel to reduce any effects of a moving portable key device.

In a consider side step 44, the portable key device is considered to be located on the outside of the barrier only when the first signal strength is greater than the second signal strength.

In a conditional inside/outside step 46, the method proceeds differently depending on whether the portable key device has been considered to be on the inside or outside. If the portable key device is considered to be on the outside, the method proceeds to an access control step 48. Otherwise, the method ends.

In the access control step 48, an access determination procedure proceeds, resulting in granted or denied access.

On the other hand, if the portable key device is considered to be on the inside, no further access determination is performed. When access control is performed without user interaction, this prevents someone on the inside from inadvertently unlocking the lock device by simply walking by the access control device.

Figure 4:
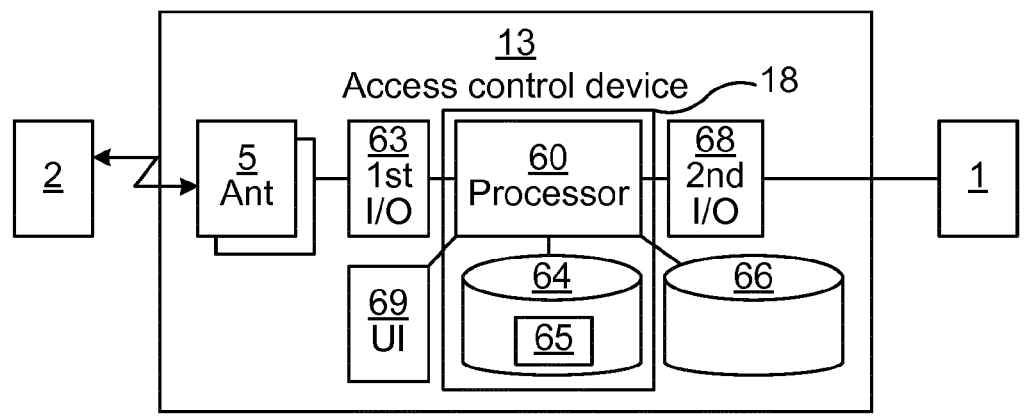
FIG. 4 is a schematic diagram illustrating an embodiment of the access control device of FIG. 1.

FIG. 4 is a schematic diagram illustrating an embodiment of the access control device 13 of FIG. 1.

A determiner 18 is arranged to consider whether the key device is located on the inside or on the outside of the barrier. In one embodiment, the determiner is a software based solution, comprising a processor 60 and memory 64.

The processor 60 controls the general operation of access control device 13. The processor 60 can be any combination of one or more of a suitable central processing unit (CPU), multiprocessor, microcontroller unit (MCU), digital signal processor (DSP), application specific integrated circuit (ASIC) etc., capable of executing software instructions or otherwise configured to behave according to predetermined logic. Hence, the processor 60 can be capable of executing software instructions 65 stored in a memory 64, which can thus be a computer program product. The processor 60 can be configured to execute the method described with reference to FIG. 3 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60, for instance signal strengths of received signals. The data memory 66 can be any combination of read and write memory (RAM) and read only memory (ROM).

The access control device 13 further comprises a first I/O interface 63 for communicating with a portable key device 2, e.g. to exchange digital authentication data. The first I/O interface 63 communicates with the portable key device 2 over a wireless interface using at least two antennas 5. The antennas 5, as explained above, can be used in the process to consider whether the portable key device is on the inside or the outside of the barrier. The first I/O interface 63 supports wireless communication over any suitable wireless interface, e.g. using Bluetooth, Bluetooth Low Energy (BLE), ZigBee, any of the IEEE 802.11 standards, any of the IEEE 802.15 standards, wireless USB, etc.

A second I/O interface 68 is used for communication with other external entities, such as the lock device 1. The second I/O interface 68 uses communication over any suitable wireless interface (such as those mentioned above for the first I/O interface 63) and/or uses wire-based communication, e.g. using Universal Serial Bus (USB), Ethernet, serial interface (e.g. RS-485 or RS-232) or even a simple electric connection, e.g. to the lock device 1. Optionally, the first I/O interface 63 and the second I/O interface 68 are combined in one unit.

Optionally, the access control device 13 also includes a user interface 69, e.g. comprising any one or more of a light emitting diodes (LED) or other lights, a display, keys or keypad, etc.

Optionally, the access control device 13 is combined with the lock device 1 in a single device. In such a case, one or more of the components of the access control device 13 can be shared with the lock device 1.

It is to be noted that the determiner 18 could also be implemented using hardware only (not shown). In such an embodiment the signal strengths from the two antennas can be measured in the analogue domain. The signal strengths are then fed to a comparator, which gives a signal positive signal when the first signal strength is greater than the second signal strength, or vice versa. A combination of hardware and software is also possible.

Figure 5:
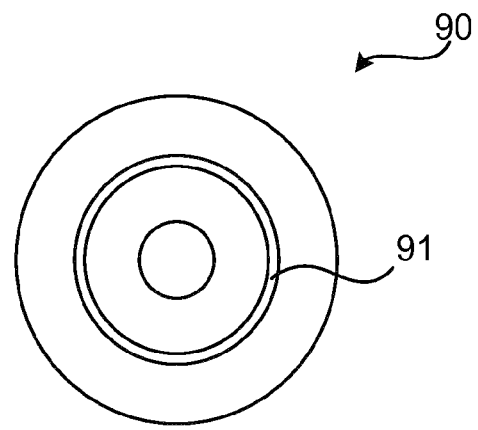
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4.

While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for considering whether a portable key device is located inside or outside a barrier, the method being performed in an access control device and comprising the steps of:
   measuring a first signal strength of a radio signal from the portable key device using a first antenna, the first antenna being directed towards the outside of the barrier and the first antenna generating a first main antenna lobe;
   measuring a second signal strength of the radio signal from the portable key device using a second antenna, the second antenna being directed towards the inside of the barrier and the second antenna generating a second main antenna lobe, wherein the second main antenna lobe generated by the second antenna is wider than the first main antenna lobe generated by the first antenna, and a gain towards the outside of the barrier by the second antenna is greater than a gain towards the inside of the barrier by the first antenna, and the signal strength from the portable key device using the second antenna is greater than using the first antenna at all positions of the portable key device on the inside of the barrier; and
   considering the portable key device to be located on the outside of the barrier only when the first signal strength is greater than the second signal strength.

2. The method according to claim 1, further comprising the step of:
   performing an access determination procedure, resulting in granted or denied access, only when the portable key device is considered to be on the outside of the barrier.

3. An access control device for considering whether a portable key device is located inside or outside a barrier, the access control device comprising:
   a first antenna being configured to be directed towards the outside of the barrier and generate a first main antenna lobe;
   a second antenna being configured to be directed towards the inside of the barrier and generate a second main antenna lobe wherein the second main antenna lobe is wider than the first main antenna lobe generated by the first antenna, a gain towards the outside of the barrier by the second antenna is greater than a gain towards the inside of the barrier by the first antenna and the signal strength from the portable key device using the second antenna is greater than using the first antenna at all positions of the portable key device on the inside of the barrier; and a determiner arranged to consider the portable key device to be located on the outside of the barrier only when a first signal strength of a radio signal from the portable key device received by the first antenna is greater than a second signal strength of the radio signal from the portable key device received by the second antenna.

4. The access control device according to claim 3, wherein the determiner comprises a processor; and a memory storing instructions that, when executed by the processor, causes the access control device to:
   measure the first signal strength of a radio signal from the portable key device using the first antenna;
   measure the second signal strength of the radio signal from the portable key device using the second antenna; and
   consider the portable key device to be located on the outside of the barrier only when the first signal strength is greater than the second signal strength.

5. The access control device according to claim 3, further comprising instructions that, when executed by the processor, causes the access control device to: perform an access determination procedure, resulting in granted or denied access, only when the portable key device is considered to be on the outside of the barrier.

6. A computer program stores on a non-transitory medium for considering whether a portable key device is located inside or outside a barrier, the computer program comprising computer program code which, when run on an access control device, causes the access control device to:
   measure a first signal strength of a radio signal from the portable key device using a first antenna, the first antenna being directed towards the outside of the barrier and generating a first main antenna lobe;
   measure a second signal strength of the radio signal from the portable key device using a second antenna, the second antenna being directed towards the inside of the barrier and generating a second main antenna lobe, wherein the second main antenna lobe generated by the second antenna is wider than the first main antenna lobe generated by the first antenna, a gain towards the outside of the barrier by the second antenna is greater than a gain towards the inside of the barrier by the first antenna, and the signal strength from the portable key device using the second antenna is greater than using the first antenna at all positions of the portable key device on the inside of the barrier; and
   consider the portable key device to be located on the outside of the barrier only when the first signal strength is greater than the second signal strength.

7. A computer program product comprising a computer program according to claim 6 and a non-transitory computer readable medium on which the computer program is stored.

* * * * *